C. G. SUNDEN.
AUTOMOBILE TIRE PUMP.
APPLICATION FILED DEC. 21, 1920.

1,420,587.

Patented June 20, 1922.
2 SHEETS—SHEET 1.

Carl G. Sunden,
Inventor

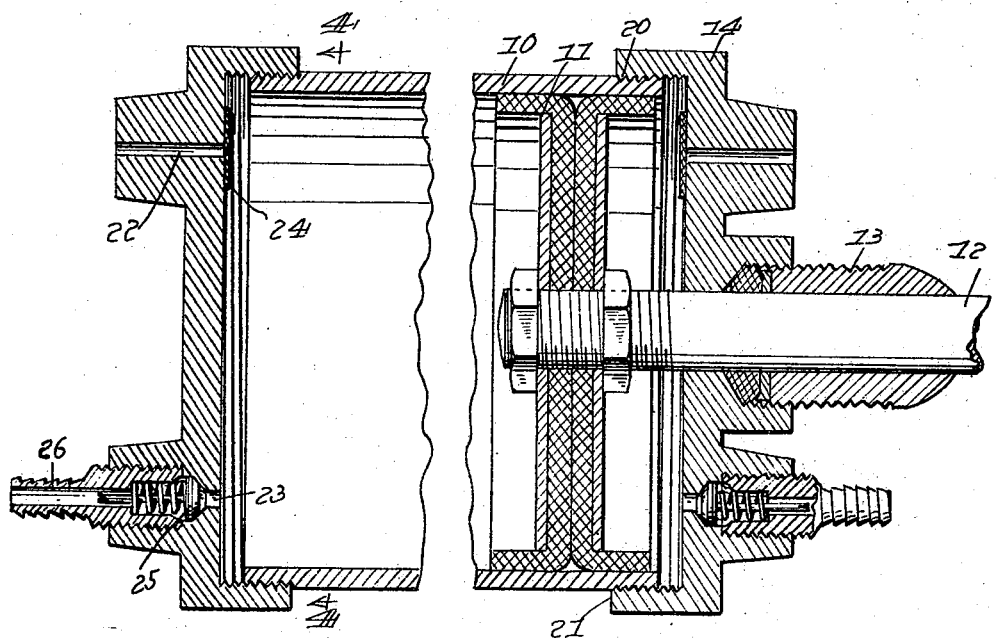
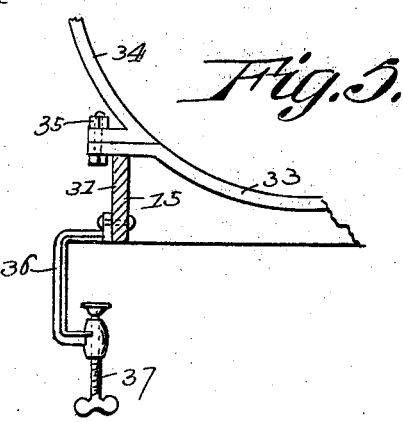
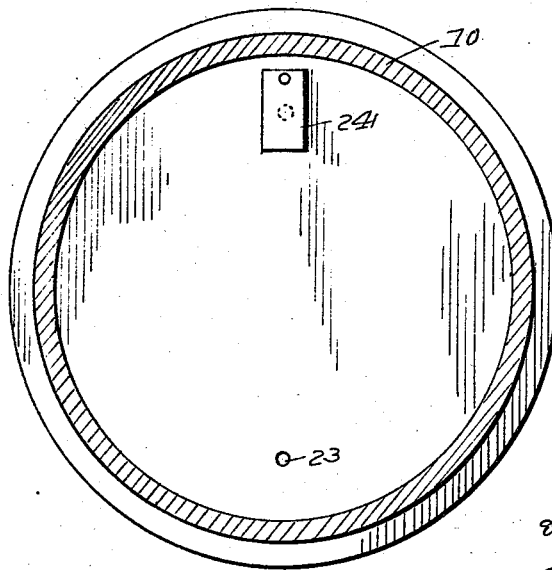

UNITED STATES PATENT OFFICE.

CARL G. SUNDEN, OF CHICAGO, ILLINOIS.

AUTOMOBILE TIRE PUMP.

1,420,587. Specification of Letters Patent. Patented June 20, 1922.

Application filed December 21, 1920. Serial No. 432,242.

*To all whom it may concern:*

Be it known that I, CARL G. SUNDEN, a citizen of the United States of America, residing at Chicago, in the county of Cook and State of Illinois, have invented new and useful Improvements in Automobile Tire Pumps, of which the following is a specification.

The object of the invention is to provide a simple, inexpensive and efficient apparatus which may be mounted in a fixed and suitable position upon an automobile running board or in like convenient relation to a vehicle of that type with operating means such as a hand lever within convenient reach of the operator of the car, to the end that the wheel tires may be readily inflated from time to time as the occasion may arise without the inconvenience of carrying a separate or detachable pump which when not in use must be stored within the vehicle and which in order to be of an effective size serves when thus stored to occupy space which can be more profitably utilized in other ways; and furthermore to provide an apparatus for the purposes indicated having the maximum efficiency and designed for operation with the minimum of effort upon the part of the operator while insuring an efficient regulable pressure to the wheel tires; and with these objects in view the invention consists in a construction, combination and arrangement of parts of which a preferred embodiment is shown in the accompanying drawings, it being understood that changes in form, proportion and details may be resorted to within the scope of the appended claims without departing from the principles involved.

In the drawings:—

Figure 3 is a detail sectional view taken longitudinally of the cylinder.

Figure 4 is a transverse section on the plane indicated by the line 4—4 of Figure 3.

Figure 5 is a detail view showing the means of securing the cylinder bed to the vehicle running board.

Figure 1:
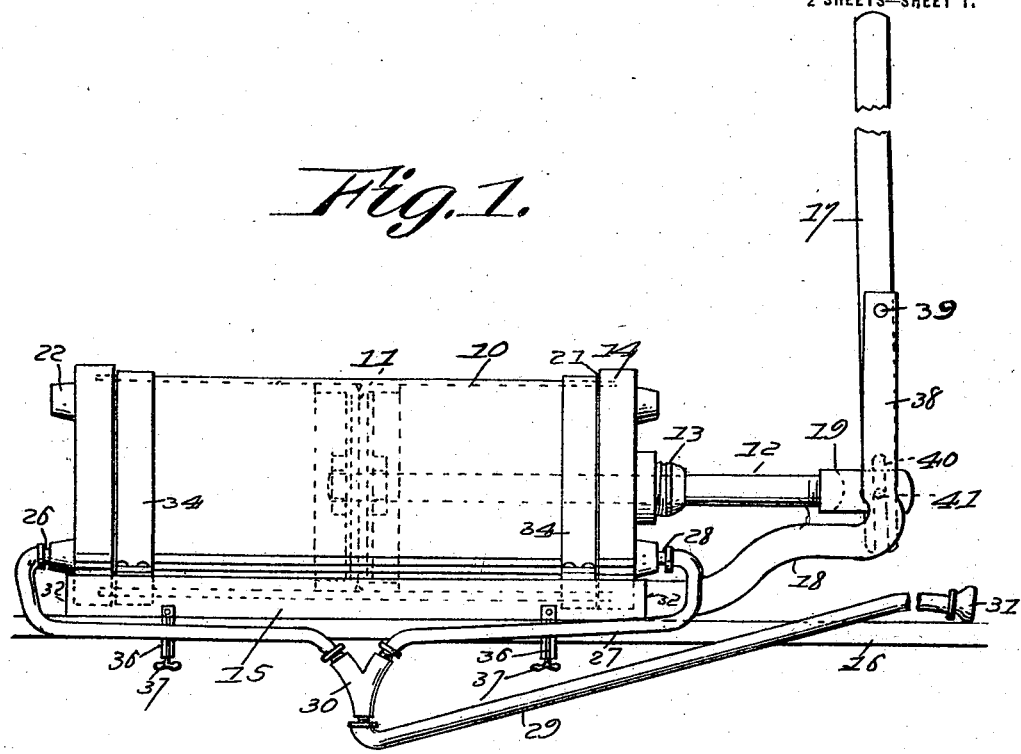
Figure 1 is a side view of a pump embodying the invention arranged in the operative position upon the running board of a vehicle.
Figure 2:
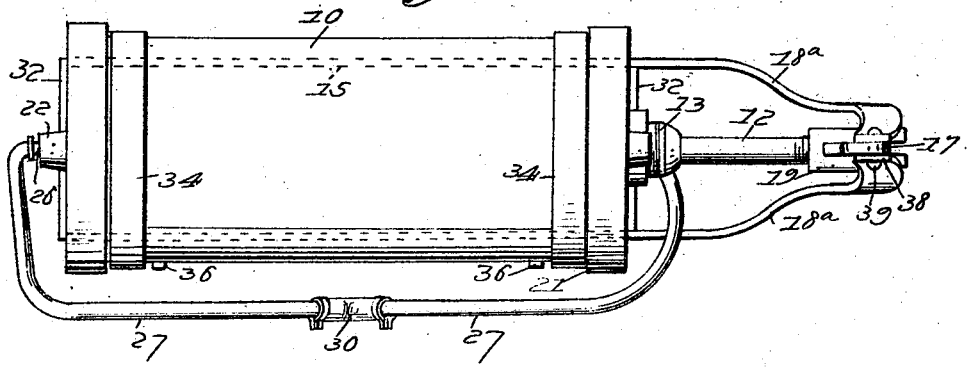
Figure 2 is a plan view of the same.

The apparatus embodies essentially the pump cylinder 10 in which is arranged the piston 11 of which the rod 12 extends through a suitable stuffing box 13 in one of the terminal heads 14 of the cylinder, a bed 15 adapted to be secured to the running board 16 of the car and serving to support and secure the cylinder in a fixed position with relation to the running board, so as to prevent displacement or vibration thereof, and an operating hand lever 17 fulcrumed upon a suitable bracket 18 extending forwardly from said bed frame and operatively connected with the terminal cross head 19 of the piston rod.

In the construction illustrated the cylinder heads are threaded upon the extremities of the cylinder wall with the flanges 20 of said heads disposed exteriorly of the cylinder wall to form at their inner ends shoulders 21, and in each of the cylinder heads are formed inlet and outlet ports 22 and 23, valved to respectively permit induction and expulsion of air by the movement of the piston. As illustrated the inlet ports are provided with clack valves 24 while the eduction ports are fitted with spring pressed poppet valves 25, coupling nipples 26 being arranged in communication with the outlet ports to provide for the connection therewith of tubes 27, secured in place by hose clamps 28 and preferably arranged in communication with a common service tube 29, a suitable branched coupling 30 being employed to connect the extremities of the supply tubes 27 with the service tube 29. The latter is adapted by means of a suitable cap 31 to be applied to the several tire valves to provide for the inflation of the tire tubes.

The bed 13 consists of an open frame having side walls 31 connected by transverse end bars 32 which are spaced apart to correspond with the length of the cylinder measured to the exterior surfaces of the heads 14, so that when the cylinder is arranged on the bed frame the said end bars are arranged in contact with the exterior surfaces of said heads and hold the cylinder against endwise displacement. Between the said end bars the frame supports transverse downwardly bowed saddles 33 in which the body portion of the cylinder rests, said saddles being complemented by straps 34 bolted at their extremities as shown at 35 to the ends of the saddles and extending over the cylinder in contact with the shoulders 21 formed by the inner edges of the flanges 20 of the cylinder heads. The cylinder is thus firmly locked against movement longitudinally by the engagement with the exterior surfaces of its heads by the end bars 32 and against transverse or radial movement by the complemental saddles and straps which combine to encircle or embrace the cylinder adjacent to the planes of the shoulders 21.

The bed frame is secured to the running board by means of clamps 36 attached to the side bars of the frame and provided with clamp screws 37 for engagement with the under surface of the running board.

The bracket 18 is formed by extensions of the side bars of the bed frame and consists of forwardly convergent arms 18ª having upturned extremities constituting standards 38 between which the hand lever 17 is fulcrumed as at 39, and the lower extremity of the hand lever is slotted as shown at 40 to fit over a transverse pin 41 carried by the piston rod cross head 19, said cross head being bifurcated as shown to receive the lower extremity of the hand lever.

Having described the invention, what is claimed as new and useful is:—

1. A tire pump for automobiles and similar vehicles having a cylinder provided with terminal heads, a bed frame for supporting the cylinder and provided with means for attachment to the running board of a vehicle, said frame having transverse cylinder embracing members consisting of downwardly bowed saddles in the plane of the frame and complemental straps extending over the cylinder and terminally attached to the extremities of said saddles, said frame having a forwardly extending bracket, and a piston operating lever fulcrumed upon the bracket.

2. A tire pump for automobiles and similar vehicles having a cylinder provided with terminal heads and intermediate inwardly facing shoulders, a bed frame for seating the cylinder and provided with means for attachment to the running board of a vehicle, said bed frame having transverse bars for respective engagement with the exterior surfaces of the cylinder heads and intermediate cylinder embracing members disposed in contact with said shoulders of the cylinder, said cylinder embracing elements consisting of downwardly bowed saddles transversely spanning and arranged in the plane of the bed frame and complemental straps extending over the cylinder and terminally secured to the extremities of said saddles, said bed frame being provided with a forwardly extending bracket, and a piston operating lever fulcrumed upon the bracket.

In testimony whereof he affixes his signature.

CARL G. SUNDEN.